Figure 1:
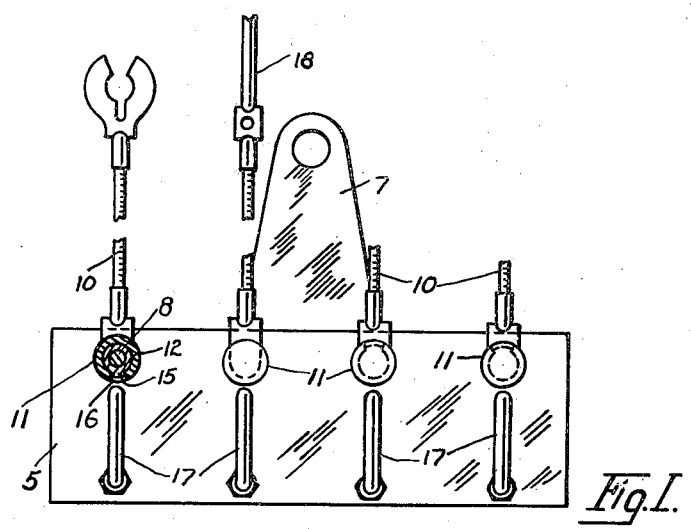

April 11, 1939. J. TAWYER 2,153,944
DEVICE FOR TESTING SPARK PLUGS AND IGNITION CIRCUITS
Filed April 21, 1937

Inventor
James Tawyer
BY Featherstonhaugh · Co.
Attys.

Patented Apr. 11, 1939

2,153,944

UNITED STATES PATENT OFFICE 2,153,944

DEVICE FOR TESTING SPARK PLUGS AND IGNITION CIRCUITS

James Tawyer, Lisarow, Australia

Application April 21, 1937, Serial No. 138,256
In Australia April 22, 1936

3 Claims. (Cl. 175—183)

This invention relates to means for testing the spark plugs and ignition circuits of internal combustion engines, and has been specially devised to provide a handy device of comparatively cheap and simple construction suitable for attachment to the engine of a motor road vehicle or other internal combustion engine for the purpose of clearly indicating whether spark plugs are functioning or are defective and for testing the ignition circuit or circuits.

This improved device for testing ignition circuits consists of a spark gap unit provided for each cylinder of the engine and arranged upon a common bracket or plate adapted to be clipped or otherwise attached to a suitable point, say at one side of the cylinder block. Each spark gap unit consists of an insulated high tension member, having provision for reception of a lead from a spark plug terminal or distributor or other point receiving high tension current. The member can thus be disconnected from or connected to the source of high tension current, the lead being preferably one which can be easily disconnected. Alongside the said high tension member a finger or the like forming the other member of the spark gap is positioned and connects to earth. Means for preventing a spark from jumping from the high tension member to said finger is also provided on each of said members. The finger member may be fixed or adjustable so as to vary or break the spark gap as desired.

In order to more fully describe this invention reference will be had to the drawing accompanying and forming part of this complete specification and wherein:—

Figure 2:
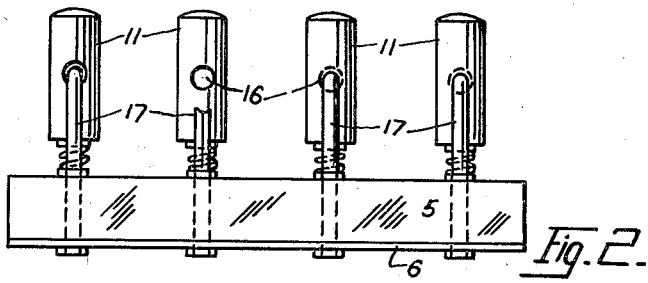
Figure 3:
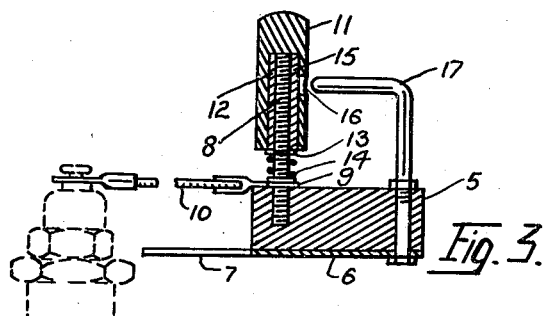
Figure 4:

Fig. 1 is a plan showing one embodiment of the invention suitable for attachment to the top of a motor engine, and Fig. 2 is an elevation of same while, Fig. 3 is a cross section taken through a spark gap unit, Fig. 4 is a sectional view of a pronged attaching clip.

The improved device consists of a plate 5 of electric insulating material affixed on a metal bracket 6 having an orificed extension 7 for attachment to a motor engine head or other suitable point.

The spark gap units each comprise a high tension member consisting of a screwed rod 8 secured at its lower end in the plate 5 with a nut 9 thereupon and under which one end of a testing lead 10 is affixed. Upon the upper end of the rod 8 a cap 11 of insulating material is rotatably mounted by means of its screwed metal bushing 12 with washer 13 and spring 14 arranged thereunder. The bushing 12 has an offset projection 15 at one side which keys it in its cap 11 and there is a sideward opening 16 through which the metal face is exposed to form one side of the spark gap.

The other member of each spark gap unit consists of a finger-like electrode 17 affixed in the plate 5 (securing the latter to its bracket 6) and having its gap end in a close proximity to the opening 16.

The testing leads 10 have suitable fittings at their ends for connection to the spark plugs or the like, and for connecting to a distributor a prong-like fitting 18 as shown in Figure 4 may be conveniently employed.

In use the improved device is affixed to any suitable point of the motor engine and leads 10 connected say to the respective spark plugs and the caps 11 partly rotated to cut off the spark gap circuit. Now the ignition circuit of each cylinder of the engine can be separately tested by turning the respective cap 11 to set its spark gap and thus causing the spark (if the current supply is present) to jump across the gap presented between the opening 16 exposed to the electrode 17, and thus revealing if the high tension supply to the plug is effective.

It will be seen that a number of cylinders can be left cut out while one is being tested thus enabling a faulty spark plug to be more easily located.

When not in use the caps 11 are rotated to shut off the spark gap circuits and are retained in position against vibrational rotation by means of the springs 14.

A suitable cover say of insulating material may be arranged to fit over the device.

It must be understood that the invention is not limited to the precise details of construction hereinbefore set forth, but such changes and alterations as fairly fall within the spirit and scope of my invention may be made.

I claim:

1. An improved device for testing spark plugs comprising a metallic bracket adapted to be attached to the engine head of a motor, a base of non-conducting material mounted on said bracket, a threaded metallic rod mounted in said non-conducting base and having a portion of its length exposed, said rod being electrically connected to a point between the spark plug and its source of current, a metallic bushing mounted on the exposed portion of said rod, a cap member rotatably mounted on said bushing, a finger member extending through said non-conducting base and attached to the metallic bracket, one end of said finger member being adjacent the insulating cap, an opening in said insulating cap adapted to be brought opposite the finger member so that a spark gap is formed between the finger member and the bushing, and a coiled spring about said rod between the insulating cap and the non-conducting base.

2. An improved device for testing spark plugs comprising a high tension member electrically connected between the spark plug and its source of current, said high tension member comprising a metal rod mounted in a non-conducting base and having a portion of its length exposed, an insulating cap rotatably mounted on the exposed portion of said rod, said cap having an opening therein, said opening being adapted to be brought opposite to the finger member so that a spark gap is formed, and a finger member forming a spark gap with said high tension member, said finger member being grounded.

3. An improved device for testing spark plugs as defined in claim 2, in which the high tension member comprises a metal rod set in a non-conducting base and having a portion of its length exposed, an insulating cap rotatably mounted on the exposed portion of said rod, a metallic bushing between said cap and said rod, an opening in said cap adapted to be brought opposite to the finger member so that a spark gap may be formed between the finger member and the metallic bushing.

JAMES TAWYER.